United States Patent [19]

Spalding

[11] 4,424,789
[45] Jan. 10, 1984

[54] FUEL LINE PREHEATER

[76] Inventor: Delbert D. Spalding, 3005 S. 33rd Ter., St. Joseph, Mo. 64503

[21] Appl. No.: 267,336

[22] Filed: May 26, 1981

[51] Int. Cl.³ .......................................... F02M 31/00
[52] U.S. Cl. .................................. 123/557; 123/552; 165/51
[58] Field of Search .................. 123/557, 552; 165/51, 165/52, 154

[56] References Cited

U.S. PATENT DOCUMENTS

| | | | |
|---|---|---|---|
| 1,686,199 | 10/1928 | Bowman | 123/557 |
| 2,528,081 | 10/1950 | Rodnesky | 123/557 |
| 3,815,562 | 6/1974 | Showalter | 123/557 |
| 4,146,002 | 3/1979 | Quinn | 123/557 |
| 4,248,197 | 2/1981 | Davis | 173/557 |
| 4,249,501 | 2/1981 | Ehresmann | 123/557 |
| 4,332,228 | 6/1982 | Lehar | 123/557 |

Primary Examiner—Ronald H. Lazarus
Attorney, Agent, or Firm—Thomas M. Scofield

[57] ABSTRACT

Improvements in fuel heating apparatus for internal combustion engines utilizing hot water from the engine cooling system as the heat exchanging medium; improvements in hydrocarbon fuel heaters and preheaters for internal combustion engines utilizing a heat exchanging jacket or sleeve on the feed line between the fuel pump and carburetor; simplified, improved heat exchangers for preheating fuel fed to an internal combustion engine employing a heat exchanging jacket on the feed line between the fuel pump and the carburetor with but a single flow passage circulating hot water from the engine block cooling system form the bleed to the heater or after the heater before the water pump to and from the jacket.

23 Claims, 11 Drawing Figures

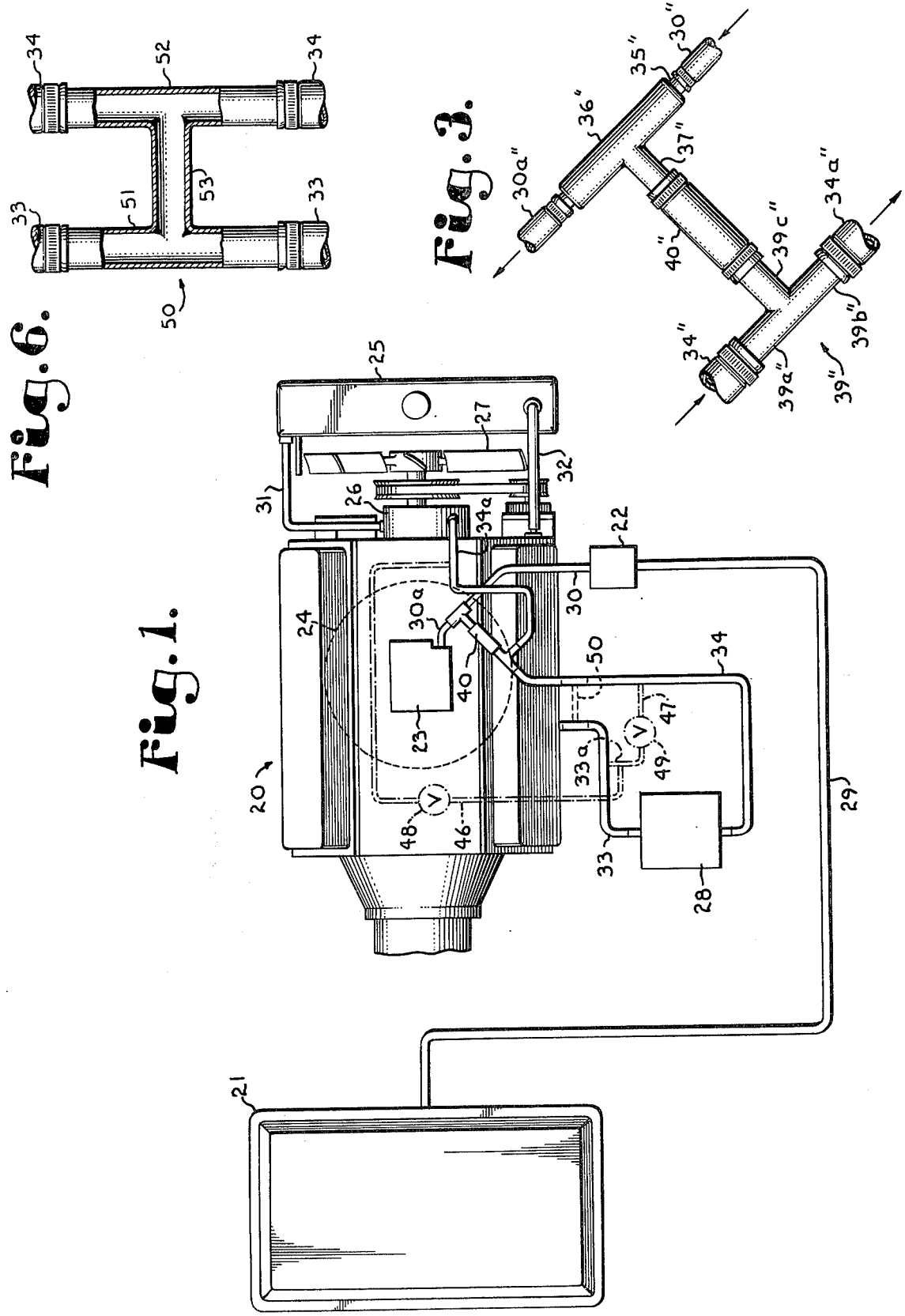

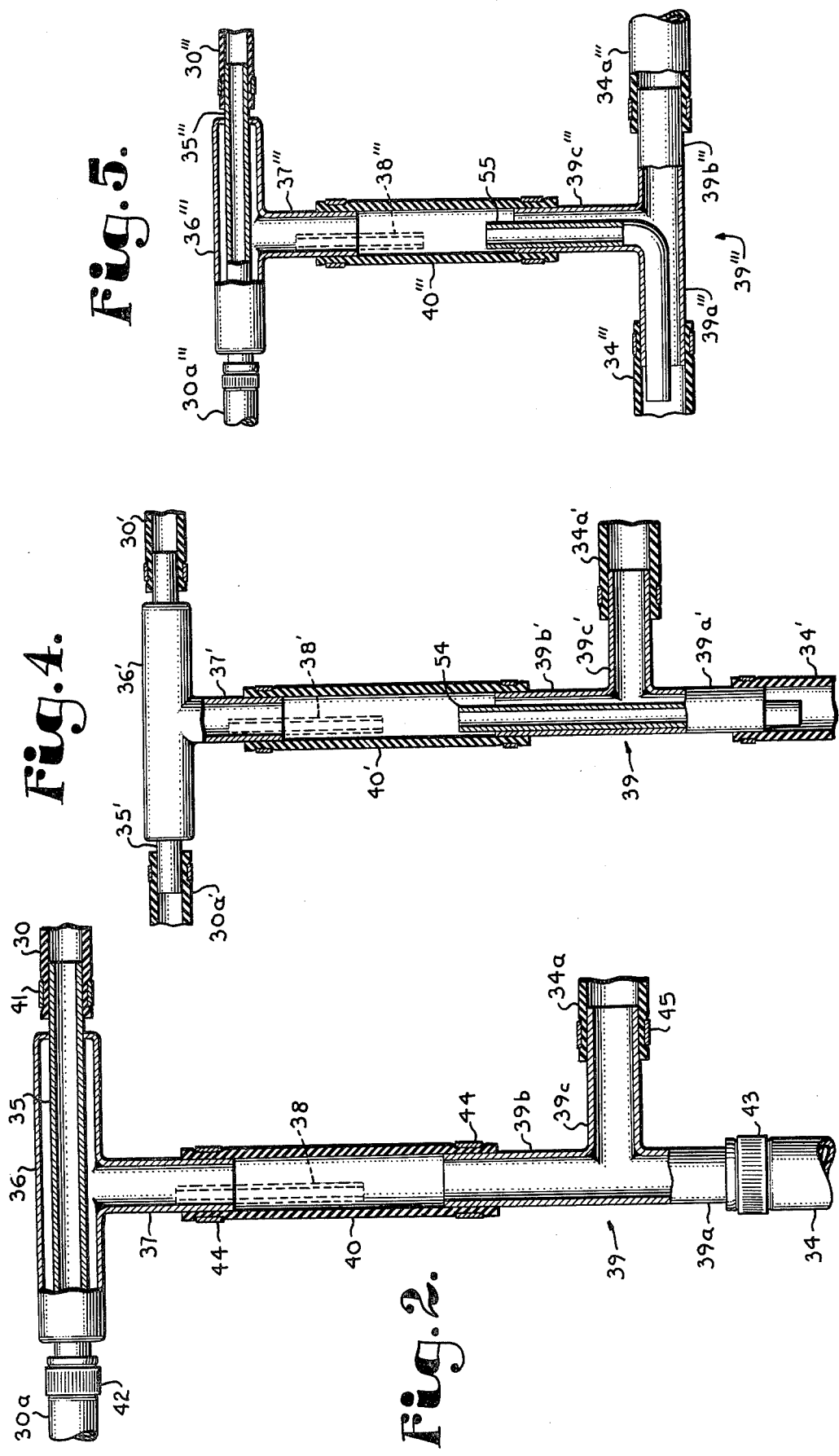

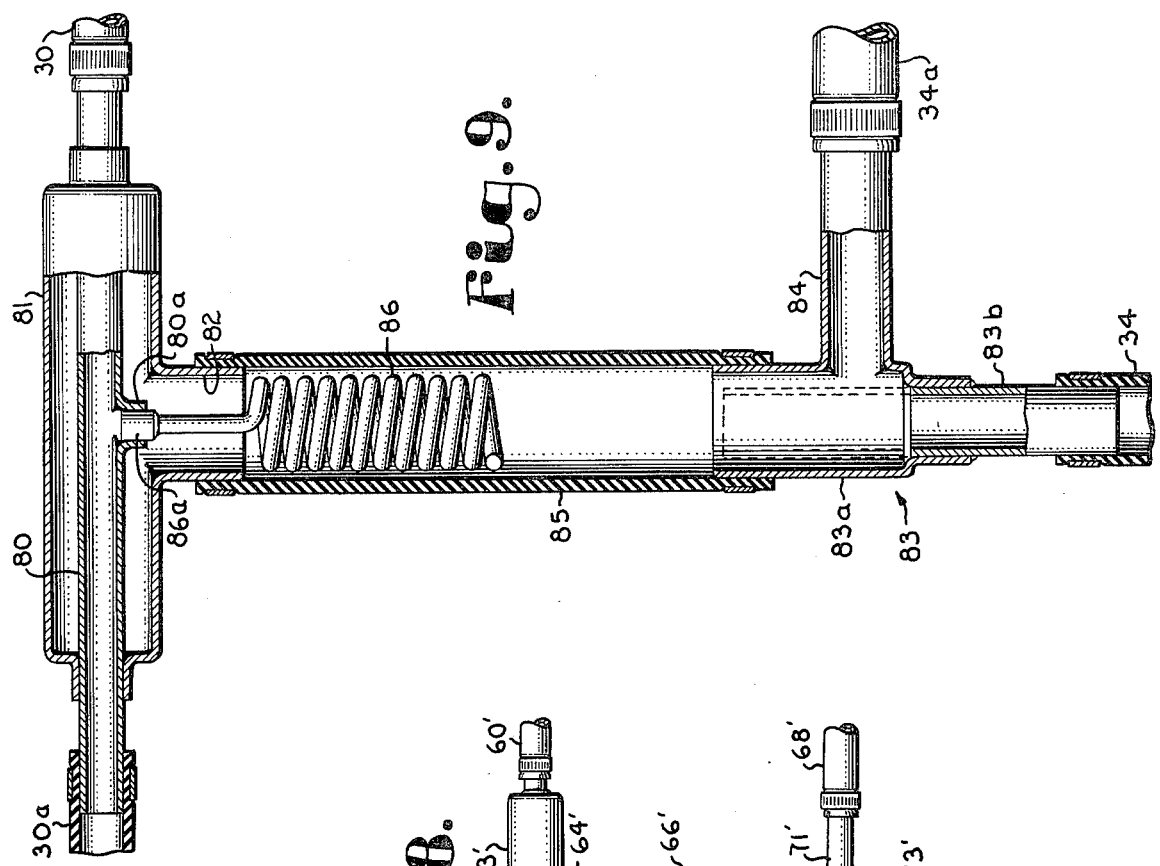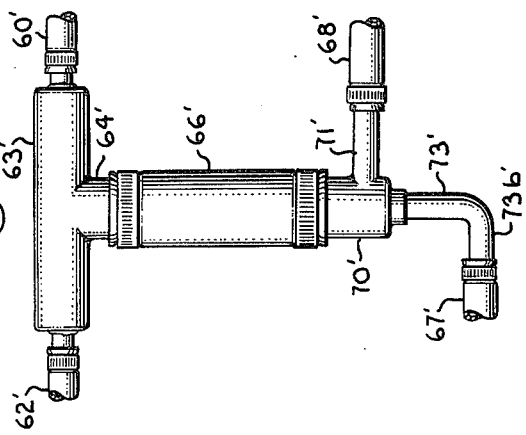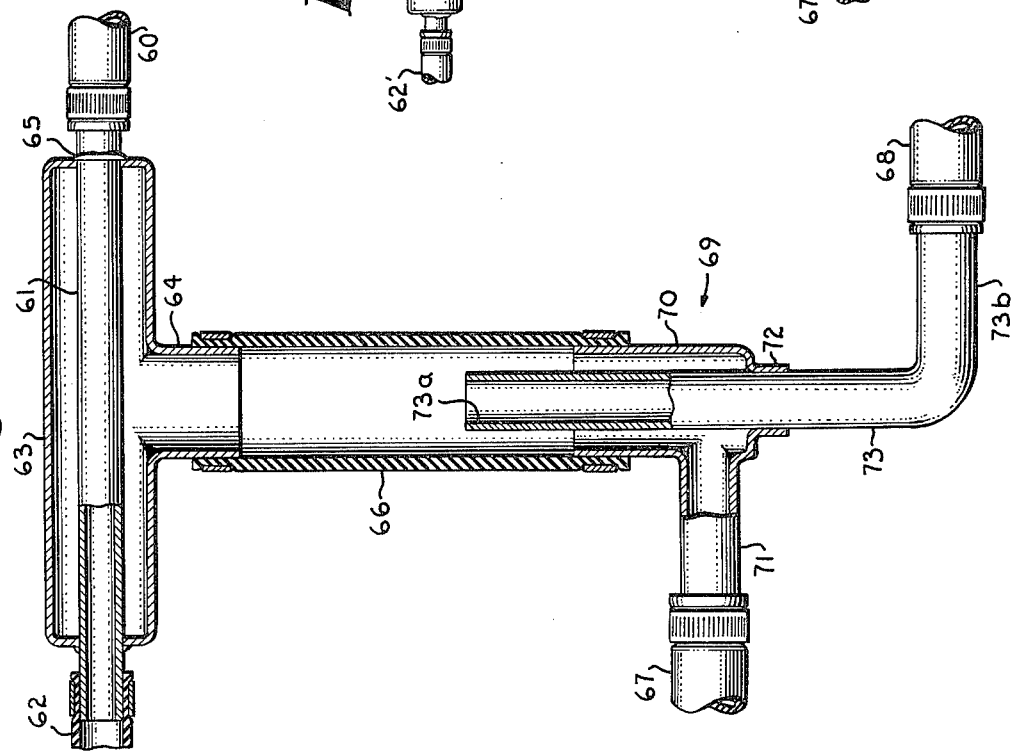

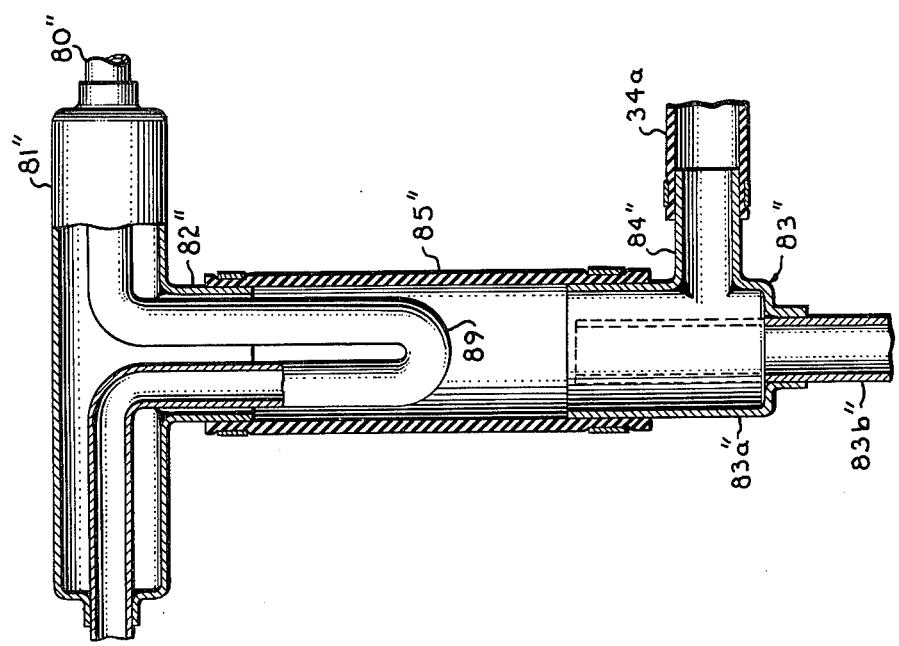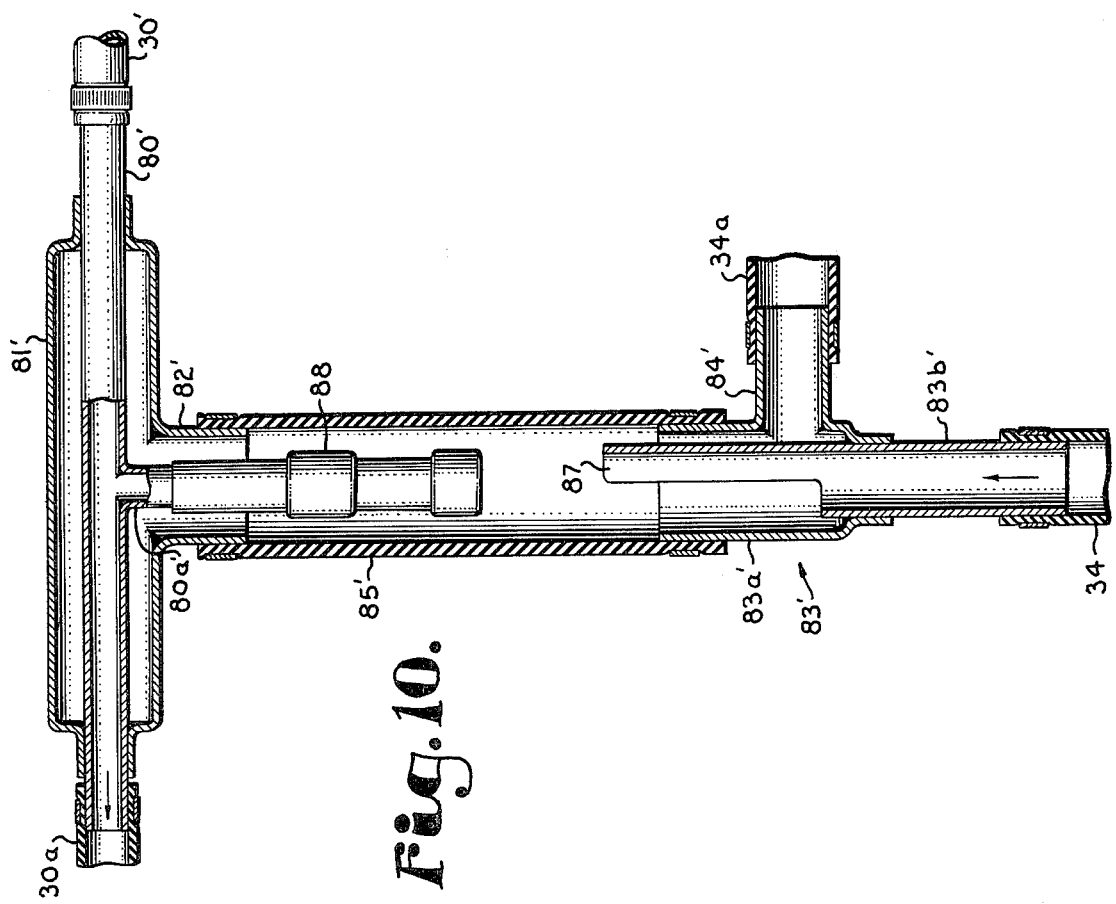

FUEL LINE PREHEATER

BACKGROUND OF THE INVENTION

This invention relates to devices to heat hydrocarbon fuel in the fuel feed line to an internal combustion engine between the fuel pump and the carburetor and refers more particularlly to such devices wherein the source of heat is water from the coolant system of the internal combustion engine, typically taken from the bleed line to the vehicle body heater after the heater and before the water pump.

It is well known that heating gasoline fuel (or any hydrocarbon fuel) substantially changes the volume of the fuel and, thus, when the fuel is relatively heated with respect to the fuel temperature in the gas tank, improved mileage is obtained. Yet further, improved function of various sorts in internal combustion engines occurs when the fuel is relatively heated before passage into the cylinders for ignition, Known effects include cleaner combustion (more complete combustion with less pollution products resulting) and smoother engine operation (less ping and knock). The relative increase in temperature in the fuel aids vaporization in the carburetor. These and various other advantages are well documented in the prior art, particularly including the citations made herebelow.

There are, generally speaking, three possible sources of heat for fuel preheating, typically, the engine exhaust gases, the hot oil in the crankcase and the hot water in the radiator and engine jacket which is also conventionally employed to power the vehicle body heater of a truck or automobile. Experience has demonstrated that the latter source of heat is by far the safest and most useful. The extreme temperature of the exhaust gases, for example, introduce a hazard as well as material and wear factor which has proved this concept not satisfactory. Access to the oil in the crank case is far less convenient, as well, than to the water/antifreeze coolant which circulates in the heater circuit, typically from an engine block connection to the heater and then to the water pump in conveniently available fashion. If a heater is not present in the circuit external of the engine from the block water jacket to the pump (very unusual) the takeoff of hot water is anywhere on this line. Some water recycle lines go directly to the radiator.

One great difficulty of any useful, commercial fuel preheater system is the complexity and vulnerability of the heat exchanger on the gas line and the water flow lines and connections into and from said sleeve exchanger. When a fuel heat exchanging system employing engine cooling water is employed as is seen in some of the prior art cited here below, the typical flow system includes one T connector in a first portion of the heater circuit, which flows hot water through a flexible line to a first connection on the gas line sleeve. The output from the gas line sleeve then involves a separate connection and flexible line leading to yet another T connection in the heater line. Each one of the junctions for this hot water bypass to the exchanger on the gas feed line is vulnerable to leakage or breakage, as well as connecting line failures. Yet further, in the crowded engine compartment, particularly in the closely packed, space-precious engine compartment of the present day, the multiplicity of lines and connections is very undesirable. Installation thereof is complex and difficult, often in difficulty accessible portions of the engine compartment and accessibility for inspection, replacement and repair is not optimum. Yet further, costs of construction, installation, maintenance and repair of such systems are excessive and the susceptibility of such system to break down or failure (with concomitant failure of the engine cooling system) have caused such proposed systems, well known to the art, to remain hypothetical and theoretical, rather than effective fuel savers and engine function optimizers.

Accordingly, what is needed and desired is a simplified, effective, cheap, dependable gasoline fuel preheater system which can be readily installed and which will function safely over a long interval of time without failure. This is the purpose of the subject invention.

Prior Art

Applicant is aware of the following patents directed to gas feed line heaters for internal combustion engines using hot water from the internal combustion engine cooling system as the heat exchanging medium. These devices are also referred to as fuel heaters and fuel preheaters.

Pope U.S. Pat. No. 1,168,111, issued Jan. 11, 1916 for "Fuel Heating Apparatus For Internal Combustion Engines";

Clemmensen U.S. Pat. No. 1,318,265, issued Oct. 7, 1919 for "Fuel Heater";

Deshaies U.S. Pat. No. 3,253,647 "Fuel Preheater" issued May 31, 1966;

Rabbiosi U.S. Pat. No. 3,986,486, issued Oct. 19, 1976 for "Reduction of Hydrocarbons Emissions . . . " and Hawkins, et al U.S. Pat. No. 4,072,138, issued Feb. 7, 1978 for "Fuel System".

Other patents directed to related processes and apparatus include:

Tartrais U.S. Pat. No. 1,623,074, issued Apr. 5, 1927 for "Fuel Supply Means For Heavy Oil Engines";

Wiltse U.S. Pat. No. 1,743,586, issued Jan. 14, 1930 for "Oil And Fuel Pump Mechanism";

Roumillat U.S. Pat. No. 2,370,261, issued Feb. 27, 1945 for "Charge Forming Device"; and Lindsay et al U.S. Pat. No. 3,763,838, issued Oct. 9, 1973 for "Carburetor Having A Heat Pipe For Vaporizing Fuel".

BRIEF DESCRIPTION OF THE INVENTION

The subject improvement is directed to a flow system and connections which take hot water from the heater circuit of an internal combustion engine and pass it to a heat exchanging sleeve or manifold inserted in the gas feed line between the fuel pump and the carburetor. One single line is taken from the heater circuit to the gas line sleeve via a suitable T connection with return of water to the circuit via the same single flow line. Means are additionally provided for maximizing heat exchange with respect to the portion of the gas line passing through the heat exchanging sleeve.

OBJECTS OF THE INVENTION

A first object of the invention is to provide improved means for preheating hydrocarbon fuel in a fuel feed line utilizing water or liquid from an internal combustion engine cooling or coolant system.

Another object of the invention is to greatly simplify the known methods and means for preheating the fuel feed to an internal combustion engine.

Another object of the invention is to provide various new, simple, dependable, strong and cheap methods of and means for heat exchanging hydrocarbon fuel being fed to an internal combustion engine, the method and means employing a heat exchanging sleeve or manifold on a portion of the gas line between the fuel pump and the carburetor, the heat exchanging medium being water or other lquid coolant from the internal combustion engine coolant system, preferably from the heater circuit on the engine.

Another object of the invention is to provide gas line sleeve constructions which incorporate means and methods for improving heat exchange in the sleeve on the gas line and the flow connections adjacent thereto.

Another object of the invention is to provide improvements in flow line connections and interconnections which effect passage of hot water or other engine coolant to a gas line heat exchanging sleeve or manifold through a but single flow line, yet achieve effective heat exchange and substantial temperature rise in the fuel passing through the gas feed line to the carburetor from the fuel pump, despite this simplification.

Another object of the invention is to provide novel line connections and gas line feed connections which permit the most efficient and optimum use of hot water or heat exchanging medium from the engine coolant system as a heat exchanging medium on the gasoline feed line, there being required but a single line connecting the gas line heat exchanging jacket and the source of hot water or heat exchange medium.

Another object of the invention is to simplify, make practical and commercial, less expensive and far more dependable and useable the well known concept of hydrocarbon fuel preheating in an internal combustion engine.

Another object of the invention is to provide new gas line heat exchanging jacket constructions and flow connections for hot water thereto, which circuit efficiently performs fuel preheating yet requires a minimum number of parts, thus minimizing failure and hazard in the system, while maximizing effectiveness and dependability.

Another object of the invention is to provide such a system as described which has the minimum number of parts, which parts are most readily available and accessible for inspection, replacement and repair as may be required or desired.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIG. 1 is a schematicized plan view from above of an automotive vehicle internal combustion engine, including radiator and gas tank, with one form of the subject improvement shown installed with respect thereto (that of FIG. 2).

FIG. 2 is an enlarged detail of the gas line insert and hot water flow line attachment between the heater outlet and the water pump of the showing of FIG. 1 with parts thereof in section to better illustrate the constructions thereof.

FIG. 3 is a fragmentary detail showing one element of the connection of FIG. 2 reversed (one T thereof reversed) in an alternative and less preferable configuration of the parts.

FIG. 4 is an enlarged fragmentary detail analogous to the showing of FIG. 2 illustrating the arrangement of FIG. 2 with a preferred form of T connection between the heater outlet and water pump utilizing a secondary tubing therein, with parts thereof in section to better illustrate the construction thereof.

FIG. 5 is an enlarged detail of the arrangement of FIG. 3 utilizing an alternate form of T connection in the water line between the heater outlet and water pump employing a secondary tube, thus improving over the results of the arrangement of FIG. 3. In FIG. 5, as in FIG. 4, parts are sectioned to best illustrate the construction of the elements involved.

FIG. 6 is an enlarged fragmentary detail of an optional bypass which may be employed in the flow circuit of FIG. 1 between the water line from the engine block to the heater and the water line from the heater to the water pump in case the heater is of the type which has an internal flow shutoff if the heater is not being used. Parts of the bypass are sectioned to best illustrate its construction.

FIG. 7 is an enlarged fragmentary detail of a modified fuel line insert and hot water flow line attachment further improving over the constructions of FIGS. 2-5, inclusive. Parts of the connections and lines therebetween are sectioned to better show the internal construction thereof.

FIG. 8 is a fragmentary detail of a modified form of the device of FIG. 7 where the hot water input and return line connections are reversed therewithin.

FIG. 9 is an enlarged detail of yet another gas line insert and hot water flow line attachment effective to heat exchange fuel going from the fuel pump to the carburetor, this construction showing means on the fuel line insert for extracting heat from the hot water bypass flow. Parts of the gas line and water line inserts, as well as the flow line interconnecting same, are sectioned to better show the internal construction.

FIG. 10 is an enlarged detail of the gas line insert and hot water flow line attachment showing another form of gas line insert with structure designed to optimize heat exchange with the hot water flow connection thereto. Parts of this device are sectioned to best illustrate the internal construction thereof.

FIG. 11 is another enlarged detail of the gas line insert and hot water flow line attachment in yet another variation at the line insert to optimize heat transfer, parts of this figure are sectioned to best illustrate the internal construction.

FIG. 1

Referring, first to FIG. 1, this view shows, in schematized plan view from above, an automotive vehicle internal combustion engine, such generally designated 20. This engine has a fuel system which supplies liquid hydrocarbon fuel (gasoline or diesel fuel, for example) to said engine. The fuel system includes a fuel tank 21, a fuel pump 22 and a carburetor 23. A conventional air cleaner is schematically indicated in dotted lines at 24 positioned, as is conventional, above the carburetor.

The engine further has a water cooling system for the engine (which may contain other equivalent liquid such as winter or all season antifreeze or other coolant in substitution for or admixture with the water). This cooling system, herein described as a water cooling system, includes a radiator 25, a water jacket in or on the engine block (unnumbered) and a water pump 26. The cooling system includes, additionally, a fan 27. Heater 28 is typically also provided mounted in the automobile vehicle body or truck cab or body in conventional fashion.

In a conventional fuel system, fuel is drawn from tank 21 through line 29 by fuel pump 22, the line 30 therefrom passing to carburetor 23 where the fuel is mixed with air and passed in conventional fashion to the cylinders of the automotive vehicle engine.

In a conventional vehicle water cooling system, water or equivalent coolant liquid in radiator 25 is drawn through line 31 to water pump 26 and then distributed by channels (not seen) conventional in nature into the water jacket of the engine. The return line from the engine water jacket to the radiator is seen at 32. In a conventional heater circuit, hot water from the engine water jacket is taken via line 33 to heater 28 and thence returned, typically via line 34 directly to the water pump 26. Some such lines go directly to the radiator. With these conventional circuits in mind as background, the subject improvement involving a gasoline or hydrocarbon fuel line preheater of novel sort, will hereinafter be described.

FIG. 2

Reference is now made to FIG. 2, wherein there is seen an enlarged sectional view of a first version of the subject improvement which involves a preheater on the fuel line (here between the fuel pump and carburetor), the heat being supplied by hot water from the heater circuit. Referring, then, to the upper portion of FIG. 2, line 30 from the fuel pump is seen in the upper right hand corner of the view. A metal pipe insert 35 is received in the end of line 30 at one inlet end thereof, with the opposite or discharge end thereof received in line 30a which goes therefrom to a conventional fuel line input to a conventional carburetor 23. Insert pipe 35 has a sleeve, jacket or manifold 36 enclosing the center length thereof in sealing fashion, adapted to receive water or other liquid heat exchanging medium from the heater circuit line 34 as will be described. Jacket 36 has inlet pipe 37 preferably, but not necessarily, received centrally thereof so that, as seen in FIG. 2, the jacket, with its input pipe, forms a T section connection encircling and leading to the gas line insert pipe 35. Inlet leg or pipe 37 may be offset toward one end or the other to give an asymmetrical T or be positioned substantially adjacent one end of the sleeve 36 to give a substantial L configuration. The symmetrical T configuration shown is preferred and optimum. Optionally, an elongate pipe 38 may be provided extending outwardly of pipe 37 and inwardly connected thereto, extension 38 of lesser internal and outer diameter than pipe or leg 37.

The supply of hot water from the heater circuit is provided as follows. Line 34, discharging from the heater 28 outlet toward water pump 26 has connected thereto a T pipe connection generally designated 39. Connection 39 has in line T top arms 39a and 39b, as well as right angle, center T leg 39c thereon. In the connection shown, line 34 is connected to T arm 39a, while the opposite, aligned, dishcarging T arm 39b is connected by flexible line 40 to inlet leg 37 of sleeve 36 on the gas line pipe insert 35. In the case of all the connections noted, from flexible lines to metal pipes, suitable conventional clamps of removable, replaceable type are employed to give tight, integral connections, as may be seen at 41 on line 30, 42 on line 30a, 43 on line 34, 44 on line 40 and 45 on line 34a which leads from T leg 39c to water pump 26.

What I have discovered, of the greatest practical significance with respect to providing a practical, useable, effective, commercial fuel line preheater is that, when a gas line preheater sleeve of the structure shown in FIG. 2 is provided, with but a single connection thereinto, substantial heating of the fuel in line 30 may be achieved. Specifically, with no more than 175 degrees F. water in line 34 from heater 28, maximum, typically less with the heater in use, the fuel, which is at ambient temperature, 45 degrees or less in the described examples, emerges into line 30a at 112 degrees. In a specific example using a 1973 Ford station wagon having a 351 cubic inch engine, the miles per gallon without the subject attachment were 11.6. With the attachment, as shown in FIG. 2, the miles per gallon were 13.7. In a 1967 three quarter ton Chevrolet truck having a 327 cubic inch engine, the gas mileage increased from 11.8 to 13.8. In a 1964 Ford gas transporter (gasoline) having a 534 cubic inch engine, the mileage increased from 3.5 to 4.0 miles per gallon. The corresponding percentage increases can be easily calculated and are substantial. The engines in such case ran more smoothly, particularly in winter conditions, with less ping and knock and observable, less visible and polluting exhaust discharge.

Thus, it may be seen that the heater line 34 is interrupted but once with the T connection 39 and the feed connection to the sleeve 36 is but a single line 40 attaching to the same T. The figures noted were obtained without the use of the further results improving optional insert pipe or tube 38.

Referring back to FIG. 1, in the event heater 28 is not in the external circuit from the engine jacket on line 33, which would be very unusual, there is seen alternative line 33a which may be provided, with branches 46 and 47 having valves 48 and 49 thereon. Line 46, which connects the outlet 33 with line 34a to water pump 26 merely shows a flow circuit which can be employed, per se, to give a complete circuit to the water pump without a heater thereon or, alternatively, if desired, with line 47, relative flow between such lines controlled by valves 48 and 49. It is quite unusual for the necessary length of hose or conduit 40 to reach six inches between the pipe ends 39b and 37 connected thereby. In very unusual circumstances, such length may necessarily exceed six inches.

Line 47 (which may be present without line 46) is a practical summertime bypass for heater 28, particularly when the heater itself has a valve therein which stops flow from line 33 to line 34 when the heater is off. A convenient means for accomplishing this connection by an insert is seen in FIG. 6 where an H connection (generally designated 50) is provided between lines 33 and 34 in the manner seen in dotted lines in FIG. 1 as an option. This connection has leg 51 connecting parts of line 33, leg 52 connecting the parts of line 34 and leg 53 intercommunicating between pipe sections 51 and 52 for the bypass flow therebetween. This connection is employed, typically, only where there is a heater shutoff, in order to provide continuous flow into line 34 and thus to the subject improvement at all times. A valve (not seen) may be provided on pipe 53 analogous to valve 49. Connection 50 is equivalent to line 47.

FIG. 4

This construction is the same as the construction seen in FIG. 2 in all details, with the exception that an additional tube or internal pipe connection is provided to increase hot water circulation into the sleeve on the gas line. Accordingly, all the parts seen in FIG. 4 which are the same or identical to like parts in FIG. 2 are numbered the same, except they are primed. These parts will not be redescribed, only the improvement of FIG. 4.

In this case, the improvement comprises the elongate tube 54 which is positioned in T arm elements 39a' and 39b', extending, preferably, somewhat outwardly from the ends thereof so as to better convey hot water from line 34' into line 40' to leg 37' and thence into sleeve 36'. Tube 54 is lesser in internal diameter and outer diameter than T arms 39a' and 39b' and is preferably rigidly fixed therewithin by brazing or welding.

In the function of the devices of FIGS. 2 and 4, the water or other coolant, which is actually hot with respect to the fuel in the gas line 30, is impelled or drawn by water pump 26 directly from line 34 into line 40 through the axially aligned T top arms 39a and 39b or 39a' or 39b'. In the case of FIG. 4, the flow is also through pipe 54. The direct impulse of the movement of coolant from line 34 into line 40, as opposed to that in the construction to be described with respect to FIG. 3, operates to effect heating of gas line pipe insert 35 (and thus the fuel therewithin) apparently by actual direct circulation into sleeve 36 and out therefrom through connection 37. If there is not actual flow into and out of sleeve 36, then flow turbulence within line 40 and probably pipe or tube 37 causes sufficient heating of the water in jacket 35 to obtain the results stated previously. This is the case whether or not line 40 is of substantial length (say 6 inches) although the shorter is line 40, the better the exchange. The latter is particularly true with respect to construction of FIG. 3, to be described. (On a practical basis, the structure of FIG. 2 will serve effectively in a line 40 up to, say, 6 inches between joined fitting pipe ends. The FIG. 4 structure will effectively work in a line exceeding 6 inches.)

It is important to note that actual testing has shown that the insertion of line 54 into the construction of FIG. 2 (as in FIG. 4) considerably improves the results obtainable with the already effective device of FIG. 2. Thus, in the 1973 Ford wagon previously noted, the increase in mileage is from 11.6 mpg to 15.3 mpg. In the 1967 Chevrolet noted, the mileage increase is from 11.8 mpg to 15.7 mpg. With respect to the 1964 Ford Gas Transporter, the mileage increase is from 3.5 to 4.4 mpg. Thus, as may be seen, not only is an effective and efficient preheater provided by the construction of FIG. 2, such is considerably increased in effectiveness by the addition of tube 54 as in FIG. 4.

FIG. 3

The analysis of this connection and its use and results, as compared with FIGS. 2 and 4 previously described, and its modification in FIG. 5 provides some extremely interesting results and information with respect to the use and effectiveness of the subject improvement. Such basically is the discovery that a single line connection into a heat exchanging sleeve will accomplish the results of the complicated prior art constructions requiring multiple connections, lines, etc. Referring, then, to FIG. 3, which merely involves the T connection of FIG. 2 (39) reversed in connection of its parts with respect to lines 34, 34a and 40, in this view, the parts which are identical to parts seen in FIG. 2 are numbered the same, but double primed. These parts will not be redescribed except as necessary to discuss function and results.

In the construction of FIG. 3, it is seen that sleeve or jacket 36' is on pipe insert 35" in gas line 30" and 30a". This sleeve has the single inlet/outlet connection, tube or pipe 37". A T connection 39" is entered into the coolant return line 34" in order to permit the bypass through the flexible line 40" to sleeve 36". In the connection shown, the aligned T arms 39a" and 39b" carry the heater circuit recycle or return flow directly to the water pump with the right angled T leg attachment 39c" bleeding off some coolant recycle from the heater or block for heating the gas line 35" in sleeve 36". It can be clearly seen that the only difference between the flows at the T connections 39 and 39" is that, in the former, the line of flow from line 34 is directly into line 40, while, in the latter the line of flow is directly into line 34a". But the change deteriorates results.

Under strictly comparable conditions as described with respect to the attachment or arrangement of the attachment seen in FIG. 2, the gasoline in line 30a" in the arrangement of FIG. 3 going to the carburetor is heated only to 88 degrees, as compared to the 112 degree gasoline in line 30a of FIG. 2. The mileages were correspondingly less and disappointing, as compared with the arrangement of FIG. 2. They were far less than the arrangement of FIG. 4, as previously described. The comparisons noted were made in vehicles where the lines 40 and 40' were less than 6 inches in length between the joined fitting pipe ends.

It is explicitly stated that merly changing the arrangement of T 39 (39") from the pattern seen in FIG. 2 to that of FIG. 3 results in substantially less heating of the fuel and concomitant benefits therefrom. The arrangement of FIG. 3, even where there is a correspondingly tube 38" (not seen in FIG. 3), is not commercial compared to the arrangements of FIGS. 2 and 4 would never preferably be employed in place of either. (The measurements, observations and results noted and reported were obtained using the identical members between the test of FIGS. 2 and 3 to get the results described, merely turning the member 39 (39") between the two illustrated orientations. Further, the line 40 was identical, as was the T sleeve 36, 37 (36", 37") of the figures, in the tests described. Between the various cars the lines 30, 30a etc. and 34, 34a, etc. remained identical also in the tests noted.)

FIG. 5

With the foregoing described arrangements and results before us, then the results obtained from the configuration of FIG. 5, which is the precise arrangement of FIG. 3 with but one single addition thereto, are perhaps surprising or startling.

Now, in FIG. 5, the same T sleeve 35, 36, 37 was employed on the gas line and an equal size and dimension T connection 39''' compared with connection 39, save with respect to the single tube insert to be described therein. This means that all flexible lines were the same dimension and all rigid lines were the same dimension as with respect to the previous tests for a given car, as was actual length. Therefore, all of the elements which are the same between FIGS. 2, 3 and 4 are numbered precisely the same, but here triple primed. Such will not be redescribed except as required.

The sole change made in the construction of FIG. 3 to reach the configuration of FIG. 5 is to provide an internal, lesser diameter tubing 55 within T connection 39''', in the single T arm 39a''' and T leg 39c''', such preferably extending slightly out of the ends thereof, thus to extend both into heater return pipe or coolant return pipe 34''' and flexible line 40''' connecting with leg 37''' of sleeve 36'''.

This single change in the construction of FIG. 3 causes a substantial improvement over the results of the construction of FIG. 2. Specifically, that is, the temperature of the gasoline in line 30a''' is 120 degrees in the test situations noted, not measurably, or substantially measurably different from the temperature of the gasoline in line 30a' of FIG. 4. The mileage results of the construction of FIG. 5, then, were equal to the mileage results given for the construction of FIG. 4. Thus the construction of FIG. 5 is fully commercial, more commercial than that of FIG. 2. However, it is more expensive to fabricate than the construction of FIG. 4. (The results with respect to the devices of FIGS. 4 and 5 hold good with respect to conduits 40' and 40'' exceeding 6 inches between the fitting pipe ends. As such distance increases, the extension of pipes 54 and 55 at each end into the joining hoses should increase for maximum results.)

The optional addition of the extension tube 38''' helped somewhat, but not significantly measurably so, re the arrangement of FIG. 5. This was the case in the previous figures described, which seems to indicate that (a) the insert tube 38, 38', etc. is not significant from a practical standpoint or enough to justify cost and (b) the significant factors in effective single line heating are (1) the main flow of the hot water return (or a substantial portion thereof) directed straight into line 40, 40', etc. and (2) such flow as to product a jet effect into line 40, etc.

From the results obtained, it is evident that the actual circulation of hot water from line 34, 34', 34''', etc. is greatest into or toward sleeve 36, 36' or 36''' when, first, the flow is directly in line with the input to the sleeve (or feeder line thereto as in FIG. 2) and, second, most great when there is a stream within a stream (insert tubes 54, 55) which may be hypothesized as providing an actual circulation stream well into the connecting line 40, etc., possibly into stem or pipe 37, etc. and conceivably even into sleeve 36, etc. At the very least, by providing tubes 54 and 55, enough turbulence in these zones is effected that convective heat exchange is enough to obtain the results desired.

Thus, I have first provided significant increases in gasoline mileage with the extraordinarly simple configuration seen in FIG. 2. Such also produces improvements in engine run and pollution reduction. By a minor change to that simple T connection construction, while still utilizing a single line input to the sleeve on the gas line insert, I have yet further significantly improved gasoline mileage and the other desired features. These results obtained, it then remained to optimize further, the configuration of the T connection on the hot water line, per se, and also that of the T sleeve connection on the gas line insert pipe. This was done as will be seen with respect to the remaining figures, with yet further improved results, as will be hereinafter described.

FIG. 7

Referring to FIG. 7, therein is shown a modification of the invention wherein the single inlet opening into the sleeve is somewhat enlarged (as compared with the constructions previously described) and, further, the interconnection member between the flow line to the gas line sleeve and the heater recycle conduit is redesigned to optimize flow toward and into the gas line sleeve and to provide maximum turbulence in the flow line to the gas line sleeve or jacket.

In FIG. 7, the gas line from the fuel pump is 60 with insert pipe 61 at its discharge end. The gas line on the outlet of the insert is 62 running to the carburetor. Jacket, sleeve or manifold 63 encloses the center portion of pipe 61 and has single inlet passage, tube or pipe 64 preferably, but not necessarily, centrally thereof to form a T connection. Insert pipe 61 is welded, brazed or otherwise attached to sleeve 63 as at 65, as is the case with respect to the other gas line insert T connections. The flexible line leading into inlet pipe 64 of jacket 63 is hose 66.

The water return line from the heater or engine block (equivalent to line 34 or 47, respectively, of FIG. 1) is flexible hose 67. The ultimate water return line to the water pump (equivalent to line 34a of FIG. 1) is flexible hose or line 68. The connection or interconnection between these lines and hose 66 is a "T" or T analogy connection generally designated 69. This member has an enlarged body element or sleeve 70 which is of the same internal and outer diameter, preferably, as inlet pipe 64, whereby to fit readily into the other end of hose 66. This body has inlet pipe 71 engaging hose 67. It also has sleeve opening 72 therewithin 90 degrees displaced from passage 71. Sleeve opening 72 receives, fixedly therewithin, pipe 73 with one end 73a extending into, through and out of body 70 (up into hose 66). The other end 73b may be angled, as shown, and is engaged by and sealed to hose 68 leading to the water pump. Pipe 73 is preferably the same gauge and inner and outer diameter as pipe 71. In FIGS. 7, 8, 9 and 11, the cross sectional area of the inlet and outlet pipes are the same and they are sized with respect to the fitting body they penetrate so that the flow volume (and working flow sections), inlet and outlet, are equal. The drawings may not quite accurately reflect this scale.

The operation of the device of FIG. 7 involves the flow of hot recycle water from the heater or engine block through hose 67 into pipe 71 and thence into body 70. From body 70, this water passes into hose 66 toward inlet opening 64. Whether or not this water actually moves into the pipe 64 and sleeve 63 to any great extent is unknown. However, it is exhausted from hose 66 through pipe 73 and thence into hose 68 to the water pump. The enlargement of passage 64 into sleeve 63 undoubtedly helps movement of hot water with respect to insert pipe 61 or at least convection in the fluid body surrounding same, or both. This configuration, as seen in FIG. 7, with respect to the cars and systems previously noted and tested, has resulted in the highest gasoline exit temperature from pipe 61, specifically, in the 130°–135° F. range. This has given concomitant increases in gas mileage, with the improved engine function parameters noted. To the extent that the hose 66 length exceeds 6 inches between engagements, it is desirable that outlet 73 extends some distance into hose 66 for best results.

FIG. 8

FIG. 8 shows the exact construction of FIG. 7 with a simple 180 degree rotation of the body 70 within hose 66. That is, the connection of hose 67 to pipe 71 in FIG. 7 is changed to a connection of that hose with pipe 73b. Likewise, the connection of pipe 73b with hose 68 of FIG. 7 is reversed to a connection of that pipe with hose 67. Accordingly, all of the parts of the device of FIG. 8 which are the same as the joint in FIG. 7 are numbered the same, but primed. These parts will not be redescribed, being identical.

In the function of the device of FIG. 8, the difference is that the input water flow from the heater or engine block passes in the lesser internal diameter pipe 73a' (not seen) within body 70 directly toward the center of passage 64. The return water is drawn into body 70 and passes out pipe 71' into recycle line 68' to the water pump. Such configuration of FIG. 8 gives the water temperatures at the high end of the 130–135 degree range noted with respect to FIG. 7 and vice versa. Thus it is, slightly, the more efficient of the two. It is not really known that there is any substantial difference between the constructions of FIGS. 7 and 8 over a long term usage bases. However, it is definitely established that both of these configurations give improved gasoline line temperature over the previously described figures. It is assumed that there is some slightly better transmission of water by jet effect into or toward line or pipe 64 on sleeve 63 (pipe 64', sleeve 63') or improved turbulence, or both, caused by the jet effect from pipe 73' into hose 66. The larger diameters of inlet pipes 64, 64', hoses 66, 66' and bodies 70, 70' also aid in circulation and heat transfer compared to the structures of FIGS. 2–5, inclusive. Hose 66' length over 6 inches between fitting pipe end connections makes preferable inlet extension 73a' (not seen) into hose 66' to an extent proportional to the distance over 6 inches.

It is assumed that suitable conventional connectors sealingly join the flexible hoses of FIGS. 7 and 8 to the metal pipes of the two T connections, one at the gas line and the other in the hot water recycle line to the water pump, typically after the heater. Yet further, as previously stated, if the engine configuration permits that conduit or hose 66 (66') be very short, then the heat exchanging of the gas line insert pipe is most effective and efficient. The results stated, in all cases, hold good for hose connections (which are typically required in modern day engines) up to 6 inches in length. Greater lengths (unusual) call for outlet 73 and inlet 73a' extension into hoses 66 and 66' approximately the distance of the greater extension, to keep the state of optimum results. These required extensions depend, to a certain extent, upon the diameter of the noted hose connections.

This raises the question of actual dimensions of the parts heretofore described. The following dimensions are given as the actual dimensions of test parts which were employed in obtaining the results stated in this specification. First, with respect to the gas line insert T connection seen in FIGS. 2–5, inclusive, the actual dimensions thereof were as follows. Internal diameter of gas line 35, etc. is 0.35 inches. Internal diameter of sleeve 36, etc. is 0.55 inches. The latter dimension is true with respect to inlet pipe 37, etc. on sleeve 36, etc. This dimension (internal dimension) is the case with respect to the elements of T connection 39, etc., specifically, 39a, etc. 39b etc. and 39c, etc. The internal diameter of members 54 and 55 is 0.3 inches. This is typically the case with respect to optional inserts 38, etc. Some of the tests were run including T connections elements 37 and all elements of 39 having internal diameters of 0.60 inches.

Comparatively speaking, the internal diameters of the pipes 71, etc. and 73, etc. were 0.55 inches. The internal diameter of body 70, 70' is 0.9 inches, which is also the internal diameter of inlet passages 64 and 64'. This, also, is the internal diameter of sleeve 63, 63'.

The length of the gas line insert (insert pipes 35, etc. and 61) typically range from five and a half to seven and a half inches with the jacket or sleeve thereon being from half to three quarters its length. The length of T arms 39a and 39b was four inches and leg 39c one and three quarters inches. The length of pipe 54 was five and a half inches. These considerations give some idea of the scale of the attachments to automotive vehicles of various types including automobiles, pickup trucks, trucks, etc. The dimensions may be varied considerably without materially effecting the results, the point being to provide sufficient flow and proper flow direction to achieve heat exchange of the gas line insert pipe.

As earlier noted, optimum flow direction toward the gas line jacket, subdivision of this flow into input and output and enlargement of the flow passage, as well as shortening of the distance the flow must traverse, all operate to improve results. However, within a wide range of these parameters, I have shown clearly that gas line heat exchange may be effected efficiently and effectively, with major substantial results, with but a single line connection between the source of hot water and the gas line heat exchanging jacket. This discovery and its effective, actual implimentation in the form shown (and to be described) make practical, commercial and useful, for the first time, a concept and process which has been theoretically projected for many years. Where mile per gallon increases from 15 to substantially 40 percent are obtained, significant savings for the individual and society are effected.

FIG. 9

FIGS. 9–11, inclusive show, primarily, attachments, modifications or revisions with respect to the gas line insert in order to enable the gas line, per se, within its jacket or sleeve, to be maximally heat exchanged in the subject single transfer line system. Each of these circuit assemblies are to be used in a system as seen in FIG. 1. Accordingly, in each case, in each of the noted figures, the hot water return line from the engine block or heater will be designated 34 and the final extension of this line to the water pump 34a. Yet further, the gas line insert tube, in each of these figures, which is to be inserted in the fuel line between the fuel pump and carburetor, engages hoses numbered on the fuel pump side 30 and on the carburetor side 30a. This will locate these lines universally with respect to the three figures and minimize excessive redescription.

Turning to FIG. 9, gas line insert tubing or pipe 80 is engaged at its inlet end by hose 30 from the fuel pump and at its outlet end by hose 30a to the carburetor. Gasoline or other hydrocarbon fuel is flowed in the regular fueling circuit from the gas tank to the cylinders of the engine through insert 80. The object and desire is to heat the fuel in insert 80 immediately before passage to the carburetor to expand the volume of hydrocarbon fuel, aid its complete combustion, minimize the volume of such required to drive the automotive vehicle and improve the pollution effluent problem by optimizing combustion, thus minimizing waste products produced from the engine. Heat exchanging jacket 81 encloses, typically, 50 to 75 percent of the length of pipe 80, is sealingly attached thereto and has single, preferably centered pipe or tubing 82 giving entrance thereto for heat exchanging liquid medium.

In the water recycle line 34, 34a, there is positioned a connection generally designated 83. Connection 83 has relatively large diameter body 83a of the same gauge and internal diameter as pipe 82, inlet pipe 83b axially in line (top arms of a T connection) with body 83a and withdrawal line or tubing 84 thereon.

In operation of the device of FIG. 9, hot water from the heater return or engine block is driven or drawn by the water pump through line 34 into arm 83b, thence discharging into body 83 directly into hose or flexible connection 85 which connects the open end of body 83a with pipe 82. This water circulates up into, at least, conduit 85, probably to some extent into conduit 82 and perhaps even into sleeve or jacket 81. Withdrawal of water from this entire flow circuit takes place through line 84 into hose 34a. Elements of heat transfer include actual hot water flow, turbulent interchange, convection and conduction into sleeve 81 through pipe 82, as is the case in previously described structure.

In order to maximize heat exchange of line 80 and, accordingly, the fuel passing therethrough, in this modification there is provided a helical wire or tubing 86 which is rigidly connected as at 86a into a suitable opening 80a in line 80. Helical structure 86 may be a solid copper or other conductive metal wire or a hollow tube sealed at at least one and optionally both ends thereof. The presence of this coil enables the hot coolant recycle liquid from line 83b to directly heat exchange material in the wall of line insert 80 even though actual flow of such heat exchange liquid may not reach into jacket 81. Such heating also increases convective heat exchange in the liquid moving in hose 85, pipe 82 and sleeve or jacket 81.

In order to increase efficiency of the entire circuit seen in FIG. 9, the input pipe of FIG. 8 (extension of pipe 83b up into body 83a as seen in dotted lines) may be employed. This, which will give a jet effect out of body 83 does increase efficiency of the device of FIG. 9 to a considerable extent. The relative extensions of heat exchanging element 86 and pipe 83b into conduit 85 depend largely on two things. First, the length of conduit 85 and, secondly, the expense permitted to be invested into the connections at the gas line or the water line, or both. The arrangement of FIG. 9 is substantially that of FIG. 2 with the difference that the body 83a is of enlarged internal diameter with respect to the arm 83b, this not being the case in FIG. 2. If one compares the optional element 38 with element 86 between FIGS. 2 and 9, it will be seen that hot water that heats element 38 heats the jacket and thus contributes to heating water in the jacket itself and thus ultimately the line 35. The water in conduit 85 striking element 86 more directly heat exchanges line 80 itself and thus the fuel therein.

The rationale, in all these cases, is to, first, minimize the connections required into (1) the gas line and (2) the water line. Where a gas line heat exchanger has to have two separate inlet and outlet pipes thereon, with connections thereto, and the water line has to have two separate inserts thereinto, then water heat exchanging the fuel line is impractical and excessively hazardous in day to day operation of the automotive vehicle because there are so many possible failure points, as well as crowding of the engine space, etc. In the present system, with a minimum number of interconnections and complexity of the interconnections required, the goal is to maximize the flow of water into or toward the gas line insert sleeve or jacket and, further, maximize the contact of the hottest possible water with gas line insert itself, its surrounding sleeve or adjuncts thereto. What I have shown in my basic invention and the various modifications and revisions thereof is that fully effective, practical, commercial and safe fuel preheating can be achieved with minimal, practical, rugged and inexpensive apparatus.

The constructions of FIGS. 9–11, inclusive are designed with maximum hose length at 85, 85' and 85" in mind. These structures permit simple fittings on the water return lines in medium length hoses (such as the water line fitting of FIG. 2 or that of FIG. 9 without the dotted line inner body extension) and minimize the required extension of inlet or outlet secondary lines (as in the constructions of FIGS. 4, 5, 7 and 8) into such hoses in very long such, thinking in terms of nine to fourteen inches or the like. Except in very extraordinarily large trucks, the size of the engines, placings of the line and size of the engine compartments preclude the necessity of very long hose 40, 66, 85, etc. extensions. Thus, the dimension given are practical for the entire range of cars operating the streets today, including the large gas guzzlers of the past and the mini cars of the present and future. Such is also true of the range of trucks up to the very largest size.

FIG. 10

The purpose of this showing is to illustrate an alternative method of improving direct heat exchange into the gas line insert, utilizing a connection to that member which extends outwardly of the heat exchanging jacket or sleeve thereon. One form of this approach was seen in FIG. 9, comprising a static metal tube or wire coiled upon itself in helical fashion to enable heating thereof to transmit heat to the wall of the gas line insert.

In the present construction, numerous elements of the device are identical to those seen in FIG. 9. These elements, except for the inlet and outlet hoses for gasoline and water, which are numbered the same corresponding to hoses in FIG. 1, are numbered the same as the corresponding structures in FIG. 9, but primed. These elements will not be redescribed in detail, only the different structures in FIG. 10 over FIG. 9.

In FIG. 9, the dotted line extension upwardly of T arm 83b (analogous to the construction of FIG. 8, which is FIG. 7 reversed, shows how a direct input jet of water or recycle hot coolant medium can be employed to increase heat exchange. In FIG. 10 a variant form of this is shown with the extension of T leg 83b' being a 180 degree arcuate segment 87. This construction effects the jet inlet of the hot water from line 34 into conduit 85', but also gives a swirling action therewithin which increases surface contact for the improvement in question.

The other change between FIGS. 10 and 9 is seen in the provision, at 80(a) of the outlet opening, of there being a closed end (but hollow) tube extension 88 fixed thereon and extending downwardly into conduit 85'. The gasoline or hydrocarbon fuel in line 80' also enters stub leg 80a' and extension 88 and thus this gasoline is heated and imparts heat to the gasoline moving in line 80', directly into the fluid. Yet further, the heating of extension 78 in conduit 85' is extended into line 80' by conduction through stub shaft 80a'. Thus, FIG. 10 is analogous to the construction of FIG. 9, but the hydrocarbon fluid to be heat exchanged actually extends into the conduit 85' and extension 78 and receives heat directly. This heating causes it to be entrained with and draw from the fuel moving in pipe 80'.

Rather remarkable mileage increases, as well as engine function increases have been obtained with the constructions just described. Thus, utilizing the construction of FIG. 10, as illustrated, with a hose 85' four inches long between fitting pipe ends 83a' and 82', in a 1971 Plymouth V8, an increase in gas mileage from 11 miles per gallon to 17.7 miles per gallon and a gas (fuel) outlet temperature at 30a of 140 degrees was obtained. The operator of the car stated that the car ran far better, with more pep and no knock or ping. With the same car, utilizing the construction of FIG. 8, of dimensions as previously described and, again, a four inch hose between fitting end connections 70' and 64', a gas mileage increase of 11 miles per gallon to 17.5 miles per gallon with a gasoline (fuel) outlet temperature at 62' of 135 degrees was achieved. The same remarks with respect to improved operation apply to this applicaton to the same car, as reported by the operator. With respect to the 1964 gasoline transporter previously mentioned, the gasoline mileage increase utlizing the construction of FIG. 8 was from 3.5 miles per gallon to 4.9 miles per gallon.

It perhaps should be remarked that the length of the hose or conduit 40, 66 and 85 employed is that called for by the arrangement of the engine and position of the parts, as well as the respective lines already existent. These lines were not shortened for purposes of the present invention, merely adapted to the engine size, line position, etc. of the vehicles in question. Yet further, there is the question of vapor lock. Vapor lock, when it occurs, occurs in the fuel pump. Where the fuel pump, is seen in FIG. 1, preceeds the gas line or fuel line insert fitting, it would be most unusual to experience the problem of vapor lock. Most fuel lines, from fuel pump to carburetor, even including the mini cars on the present day market, are well over a foot in length up to, in many instances, 18 to 24 inches. Even in the "hottest" fitting arrangements described, it is most unusual to be able to detect any heating effect on the inlet side of the line up to a foot away and in most cases even less. Most fuel lines, of course, are metal from the fuel pump to the carburetor. To insert the gas line inserts 35, 61, 80, etc., a section of this line is cut out and the rigid pipe or tubing insert joined by two hose sections with four clamp connectors. In the event the gas line is not rigid, then the flexible line is merely cut and hose clamp connectors used on the rigid gas line insert.

FIG. 11

The device in FIG. 11 is a logical extension of FIG. 10 in that the gas line insert itself is so configured as to extend into the heat exchanging fluid carrying conduit. In this view, parts which are the same as parts in FIG. 9 are numbered the same, but doubled primed. These will not be redescribed.

The essence of the FIG. 11 construction is that the gas line insert includes a coil or extension 89 of gas line insert 80" which extends down through the single opening 82' into conduit 85. In this manner, it is not necessary that the heat exchanging medium from the heater or engine block actually reach into the sleeve 81 to any significant extent. The direct impact of water or antifreeze in its hot recycled condition on coil section 89 in conduit 85 will effect the desired heat exchange. Further, heating of the wall of the U bend tubing also is transmitted by conduction into the wall of the same tubing in jacket 81".

In an actual reduction to practice of the device of FIG. 11, the length of pipe 80" from free end to free end is 8½ inches. The internal diameter of jacket 81" and pipe 82" thereon is approximately 0.75 inches. The internal diameter of pipe 80" is approximately 0.3 inches. The extension of coil or U bend 89 out of pipe 32" is 1¾ inches. For FIG. 10, in an actual reduction to practice, the length of pipe 80' is 7¾ inches and internal diameters of sleeve 81' and pipe 82' 0.75 inches. Tubing 80' internal diameter is 0.3 inches and the extension of pipe or sleeve extension 88 is 2¾ inches outside pipe 82'. In an actual reduction to practice of the construction of FIG. 9, the substantial same dimensions for the tubing and jacket were employed as last described for FIG. 10. The extension of the helical coil out of pipe 82 was 2¾ inches.

Optimum results are achieved using the construction of FIG. 11 at the gas line and the construction of FIG. 8 at the hot water recycle line. As noted, the recycle water line construction of FIG. 8 is apparently the most efficient of those shown with FIG. 7 closely therebehind. The FIG. 9 dotted line structure is substantially that of FIG. 8. My tests have shown that the addition of a supplemental heat exchanging element on the gas line side or end (as seen in FIGS. 9-11, inclusive) considerably improved results with any of the water line side attachments or connection when the conduit 66, 85, etc. is necessarily long. When the conduits are in the one foot or under range, the constructions on the gas line insert of FIGS. 9-11, inclusive are not necessary, but do further improve performance.

Thus I have shown that substantial, advantageous, commercial fuel preheating can be carried out in extremely simple, rugged, inexpensive and easily applied equipment, such far more safe, reliable, easily installed and repaired, etc. than the prior art constructions as seen in the noted references. Thus I contend that I have made practical, commerical and effective a mode of fuel line heating which improves engine operation, should be of significant economic value to the user, commerical value to commercial users and social value to this country, permitting substantial fuel savings by use of a simple, safe, effective device readily installed in automotive vehicles.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. In an internal combustion engine having a fuel system supplying liquid hydrocarbon fuel to said engine,
    said fuel system including a fuel tank, a carburetor and a fuel pump for directing the fuel from said tank to said carburetor through a fuel feed line, and
    a water cooling system for the engine, said water cooling system including a radiator, a water jacket on the engine block, a water pump and at least one water circulating conduit of the engine cooling system external of the engine block running from said block to said pump or the radiator, the improvement comprising:

a portion of the fuel feed line between the fuel pump and the carburetor enclosed with a heat exchanging hollow sleeve adapted to receive liquid water heat exchanging medium therein around a length of said fuel feed line to heat the fuel therein, there being but a single inlet opening into said sleeve for said liquid water heat exchanging medium to enter and exit said sleeve, and a single flow line interconnecting the said water circulating conduit with said single inlet opening in said sleeve, whereby there is flow communication for hot water from said engine cooling system between said conduit and sleeve, the single inlet opening into said sleeve comprising a pipe length making, with said sleeve, a T connection, the fuel feed line running through the top arm of the T and the connection with the conduit including a flexible line engaging said pipe line, there being a lesser diameter flow conduit within, connected to and extending outwardly from said sleeve pipe length into said flexible line aiding in flowing heat exchanging medium from said conduit into said sleeve and therefrom.

2. In an internal combustion engine having a fuel system supplying liquid hydrocarbon fuel to said engine, said fuel system including a fuel tank, a carburetor and a fuel pump for directing the fuel from said tank to said carburetor through a fuel feed line, and a water cooling system for the engine, said water cooling system including a radiator, a water jacket on the engine block, a water pump and at least one water circulating conduit of the engine cooling system external of the engine block running from said block to said pump or the radiator, the improvement comprising:

a portion of the fuel feed line between the fuel pump and the carburetor enclosed with a heat exchanging hollow sleeve adapted to receive liquid water heat exchanging medium therein around a length of said fuel feed line to heat the fuel therein, there being but a single inlet opening into said sleeve for said liquid water heat exchanging medium to enter and exit said sleeve, and a single flow line interconnecting the said water circulating conduit with said single inlet opening in said sleeve, whereby there is flow communication for hot water from said engine cooling system between said conduit and sleeve, the single flow line connecting the conduit with the sleeve inlet opening being connected thereto through a T connection wherein the entire upper straight arm of the T is a part of the said conduit and the lower leg of the T at right angles thereto is connected to said sleeve inlet opening, there being an integral, right angle, internal, lesser diameter flow conduit in said T positioned partly in said T straight arm and in said T lower leg aiding in flowing heat exchanging medium from said conduit into and out of said sleeve.

3. An improvement as in claim 2 wherein said lesser diameter flow conduit extends outwardly past the T arm portion containing same and the T leg portion containing same.

4. In an internal combustion engine having a fuel system supplying liquid hydrocarbon fuel to said engine, said fuel system including a fuel tank, a carburetor and a fuel pump for directing the fuel from said tank to said carburetor through a fuel feed line, and a water cooling system for the engine, said water cooling system including a radiator, a water jacket on the engine block, a water pump and at least one water circulating conduit of the engine cooling system external of the engine block running from said block to said pump or the radiator, the improvement comprising:

a portion of the fuel feed line between the fuel pump and the carburetor enclosed with a heat exchanging hollow sleeve adapted to receive liquid water heat exchanging medium therein around a length of said fuel feed line to heat the fuel therein, there being but a single inlet opening into said sleeve for said liquid water heat exchanging medium to enter and exit said sleeve, and a single flow line interconnecting the said water circulating conduit with said single inlet opening in said sleeve, whereby there is flow communication for hot water from said engine cooling system between said conduit and sleeve, the single flow line connecting the water circulating conduit with the sleeve inlet opening being connected thereto through a T connection wherein the entire upper straight arm of the T connects said conduit with said opening and the lower leg of the T is a portion of the conduit, there being an internal, straight, lesser diameter flow conduit in said T connection straight top arm aiding in flowing heat exchanging medium from said conduit into and out of said sleeve.

5. An improvement as in claim 4 wherein said lesser diameter flow conduit extends out of each end of the T straight top arm.

6. In an internal combustion engine having a fuel system supplying liquid hydrocarbon fuel to said engine, said fuel system including a fuel tank, a carburetor and a fuel pump for directing the fuel from said tank to said carburetor through a fuel feed line, and a water cooling system for the engine, said water cooling system including a radiator, a water jacket on the engine block, a water pump and at least one water circulating conduit of the engine cooling system external of the engine block running from said block to said pump or the radiator, the improvement comprising:

a portion of the fuel feed line between the fuel pump and the carburetor enclosed with a heat exchanging hollow sleeve adapted to receive liquid water heat exchanging medium therein around a length of said fuel feed line to heat the fuel therein, there being but a single inlet opening into said sleeve for said liquid water heat exchanging medium to enter and exit said sleeve, and a single flow line interconnecting the said water circulating conduit with said single inlet opening in said sleeve, whereby there is flow communication for hot water from said engine cooling system between said conduit and sleeve, there being a heat conducting element connected to said fuel flow line in said sleeve extending out of the sleeve into said interconnecting flow line, the heat conducting element not receiving fuel from said fuel flow line.

7. An improvement as in claim 6 wherein the heat conducting element comprises a single hollow pipe extending from said fuel flow line and opening thereinto having its free end closed.

8. In an internal combustion engine having a fuel system supplying liquid hydrocarbon fuel to said engine, said fuel system including a fuel tank, a carburetor and a fuel pump for directing the fuel from said tank to said carburetor through a normally flexible (after the fuel pump) fuel feed line, and a water cooling system for the engine, said water cooling system including a radiator, a water jacket on the engine block, a water pump and at least one normally flexible, recycle water or heat exchanging medium circulating conduit of the engine cooling system external of the engine block running from said block to said water pump or the radiator, the improvement comprising, in combination:

a substantially rigid pipe insert into said fuel feed line between the fuel pump and the carburetor, a portion of the length of said insert enclosed with a heat exchanging, substantially rigid, hollow sleeve adapted to receive liquid heat exchanging medium therein to heat the fuel within said pipe insert, there being provided but a single inlet opening into said sleeve intermediate its ends for said liquid heat exchanging medium to enter and exit said sleeve, a single, substantially rigid exchanger pipe connection connected to and extending substantially at right angles to the sleeve, surrounding said inlet opening, a substantially rigid insert into said recycle conduit between said block and said water pump, said insert comprising a hollow body having only three pipe connections thereinto, the recycle conduit connected to two of said pipe connections and a single, substantially flexible hose interconnecting the third pipe connection with the exchanger pipe connection, whereby there is flow communication for hot heat exchanging medium from said engine cooling system between said recycle conduit and sleeve, as well as normal recycle flow of heat exchanging medium from the block to the pump.

9. An improvement as in claim 8 wherein there is a lesser diameter flow conduit within, connected to and extending outwardly from said exchanger pipe connection into said flexible hose interconnecting the third pipe connection with the exchanger pipe connection aiding in flowing heat exchanging medium from said hose into said sleeve and therefrom, as well as heat conduction in the body of said sleeve.

10. An improvement as in claim 8 wherein the rigid insert into said recycle conduit comprises a T connection wherein the recycle conduit is connected to the ends of the upper sleeve arm of the T and the lower leg of the T, at right angles thereto, is connected to the single flexible hose interconnecting the third pipe connection with the exchanger pipe connection.

11. An improvement as in claim 10 wherein there is an integral, right angle, internal, lesser diameter conduit in said T connection positioned partly in said T straight arm and in said T lower leg aiding in flowing heat exchanging medium from said third pipe connection to said exchanger pipe connection.

12. An improvement as in claim 8 wherein said rigid insert into said recycle conduit comprises a T connection wherein the entire upper straight arm of the T connects the portion of said recycle conduit from said block and said single flexible hose interconnecting the third pipe connection with the exchanger pipe connection and the lower leg of the T, at right angles thereto, is connected to the remainder of the recycle conduit.

13. An improvement as in claim 12 where there is an internal, straight, lesser diameter flow conduit in said T connection straight top arm aiding in flowing heat exchanging medium from said recycle conduit toward said sleeve.

14. An improvement as in claim 8 where there is a heater in the said recycle conduit between the engine block and the water pump and the rigid insert thereinto is within said conduit between the heater and the water pump.

15. An improvement as in claim 14 wherein there is a bypass flow line between the recycle conduit before the heater and the recycle conduit after the heater, the latter before the rigid insert into said recycle conduit.

16. An improvement as in claim 11 wherein there is a heat conducting element connected to said rigid pipe insert into said fuel feed line within said sleeve and extending out through the single inlet opening thereinto into said single flexible hose interconnecting the third pipe connection with the exchanger pipe connection.

17. An improvement as in claim 16 wherein the heat conducting element is connected to said pipe insert, but does not receive fuel from the fuel flow line.

18. An improvement as in claim 16 wherein the heat conducting element comprises a single hollow pipe extension connected to and extending from said rigid pipe insert into said fuel feed line and opening thereinto at the end at said connection while having its free end closed.

19. An improvement as in claim 11 wherein said heat conducting element comprises a U bend extension of said fuel flow line through which the fuel passes.

20. An improvement as in claim 8 wherein, in the rigid insert into said recycle conduit, the inlet pipe connection of the recycle conduit and the third pipe connection to the single flexible hose are axially aligned with one another.

21. An improvement as in claim 20 wherein one of said pipe connections partly encloses the other within the hollow body of said rigid insert.

22. An improvement as in claim 8 wherein the heat exchanging fluid from said recycle conduit is jetted into said single flexible hose interior of the liquid withdrawal from said hose to the remainder of said recycle conduit.

23. An improvement as in claim 8 wherein the heat exchanging medium from the inlet recycle conduit is jetted into said single flexible hose exterior of the heat exchanging medium withdrawal from said hose.

* * * * *